J. KERR.
METHOD OF FORMING NUT LOCKING WASHERS.
APPLICATION FILED MAR. 14, 1916.
1,231,909.
Patented July 3, 1917.
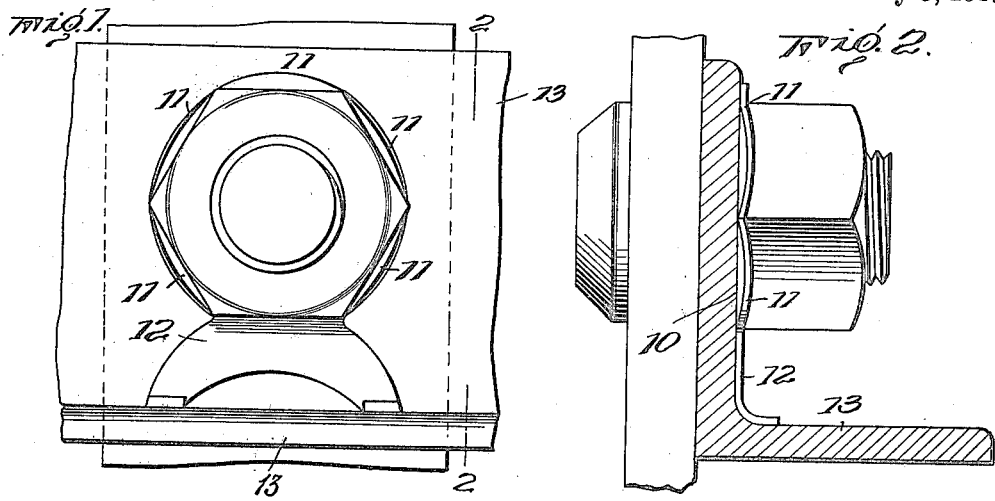
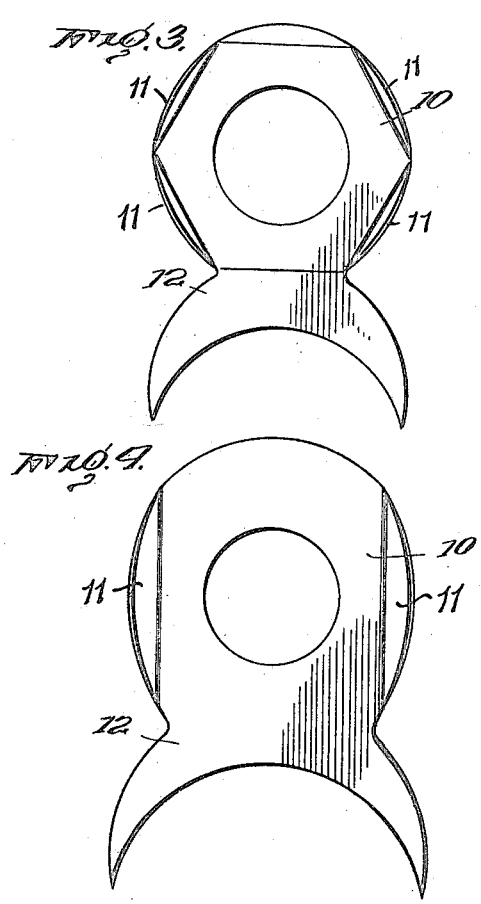
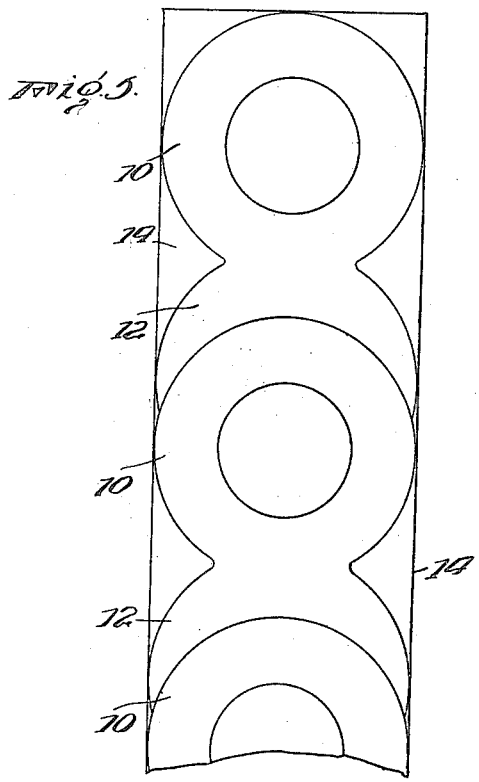
Inventor
Jay Kerr

UNITED STATES PATENT OFFICE.

JAY KERR, OF ADRIAN, MICHIGAN.

METHOD OF FORMING NUT-LOCKING WASHERS.

1,231,909.  Specification of Letters Patent.  Patented July 3, 1917.

Application filed March 14, 1916. Serial No. 84,121.

*To all whom it may concern:*

Be it known that I, JAY KERR, a citizen of the United States, residing at Adrian, in the county of Lenawee and State of Michigan, have invented certain new and useful Improvements in Methods of Forming Nut-Locking Washers, of which the following is a specification.

This invention relates to improvements in method of forming nut locking washers for preventing the retrograde movement of nuts upon bolts, and has for one of its objects to simplify, improve, and cheapen the construction of devices of this character.

Another object of the invention is to provide means whereby a plurality of the improved devices may be constructed from a single strip of metal substantially without waste of material.

With these and other objects in view, the invention consists in certain novel features of construction, as hereinafter shown and described and then specifically pointed out in the claims; and in the drawings illustrative of the preferred embodiment of the invention—

Figure 1 is a view of a bolt and nut and portions of the members through which the bolt passes, with the improved nut holding washer applied;

Fig. 2 is a side elevation with one of the members in section on the line 2—2 of Fig. 1;

Fig. 3 is a view of one of the improved washers before the nut is applied thereto, in the form adapted to be employed with a hexagonal nut.

Fig. 4 is a view similar to Fig. 3 showing the form of the device adapted to be employed in connection with a square nut;

Fig. 5 is a view of the blank from which a plurality of the improved washers are constructed.

Corresponding and like parts are referred to in the following description and indicated in all the views of the drawings by the same reference characters.

The improved device may be applied without material structural change to nuts of various forms and comprises a body portion, represented as a whole at 10, the major portion of the body being circular and corresponding initially in diameter to the greatest diameter of the nut, or so that the corners of the nut coincide at certain points with the edge of the circular portion of the washer, as illustrated in Figs. 3 and 4. It will be noted by reference to Fig. 3 that all the corners of a hexagonal nut will touch the margin of the circular portion of the body 10, and in Fig. 4 all the corners of a square nut will likewise coincide or touch the margin of the circular portion of the body. Thus the segmental portions of the body which project beyond the flat faces of the nut may be bent at an angle to the faces of the body as shown at 11, and will yieldably engage the side faces of the nut, as illustrated in Figs. 1 and 2.

The segmental portions of the body are bent at an angle slightly greater than the "pitch" of the thread of the bolt, and then when the nut is rotated upon the bolt and against the body of the washer, the corners of the nut will spring the bent segmental portions toward the member through which the bolt passes until the nut has reached its place upon the washer, with the corners of the nut located respectively in alinement with the junctures of the bent segmental portions. This movement removes the corners of the nut from engagement with the segmental portions of the washer, leaving them free to spring back to place and hold the nut from retrograde movement, or locking the nut to the bolt. While the resiliency of the segmental portions of the washer are sufficient to hold the nut from working loose under ordinary conditions, the nut can be removed by a wrench in the ordinary manner. Projecting from one side of the body 10 is a holding portion, indicated at 12, which will project into engagement with a stationary portion of the adjacent body through which the bolt passes, for instance one leg of an L-shaped member 13, as shown in Fig. 2.

The improved washers will be constructed from a single plate of the requisite weight of metal and represented as a whole at 14, the washers including the projections 12 being outlined upon the plate 14. It will be noted that the outer edge of each projection 12 coincides with the adjacent portion of the body 10 of the next washer, so that the lines of cleavage between each pair of the washers are the same, thus practically eliminating waste of material. By this means of forming the washers it will be noted that the amount of waste is reduced to a minimum and the expense of manufacture very materially reduced.

Having thus described the invention, what is claimed as new is:—

1. The method of forming nut locking washers which consists in producing a plurality of bolt receiving apertures spaced apart in a strip of metal and then severing the strip intermediate each pair of apertures by a cleft extending entirely through the strip from side to side and deflected from a straight line from end to end, whereby washers are produced each having a plurality of bearing points at one side.

2. The method of forming nut locking washers which consists in producing a plurality of bolt receiving apertures spaced apart in a strip of metal and then severing the strip intermediate each pair of apertures by a segmentally directed cleft, whereby washers are produced each having a plurality of bearing points at one side.

3. The method of forming nut locking washers which consists in producing a plurality of bolt receiving apertures spaced apart in a strip of metal and then severing the strip transversely intermediate each pair of apertures, the severing being concentric to each aperture and one side of each severing forming a portion of the periphery of the next washer.

In testimony whereof I affix my signature.

JAY KERR. [L. S.]

Copies of this patent may be obtained for five cents each, by addressing the "Commissioner of Patents, Washington, D. C."